Dec. 2, 1952 C. C. S. LE CLAIR 2,619,979
UNLOADER FOR HYDRAULIC PUMPS
Filed Oct. 1, 1947 2 SHEETS—SHEET 1

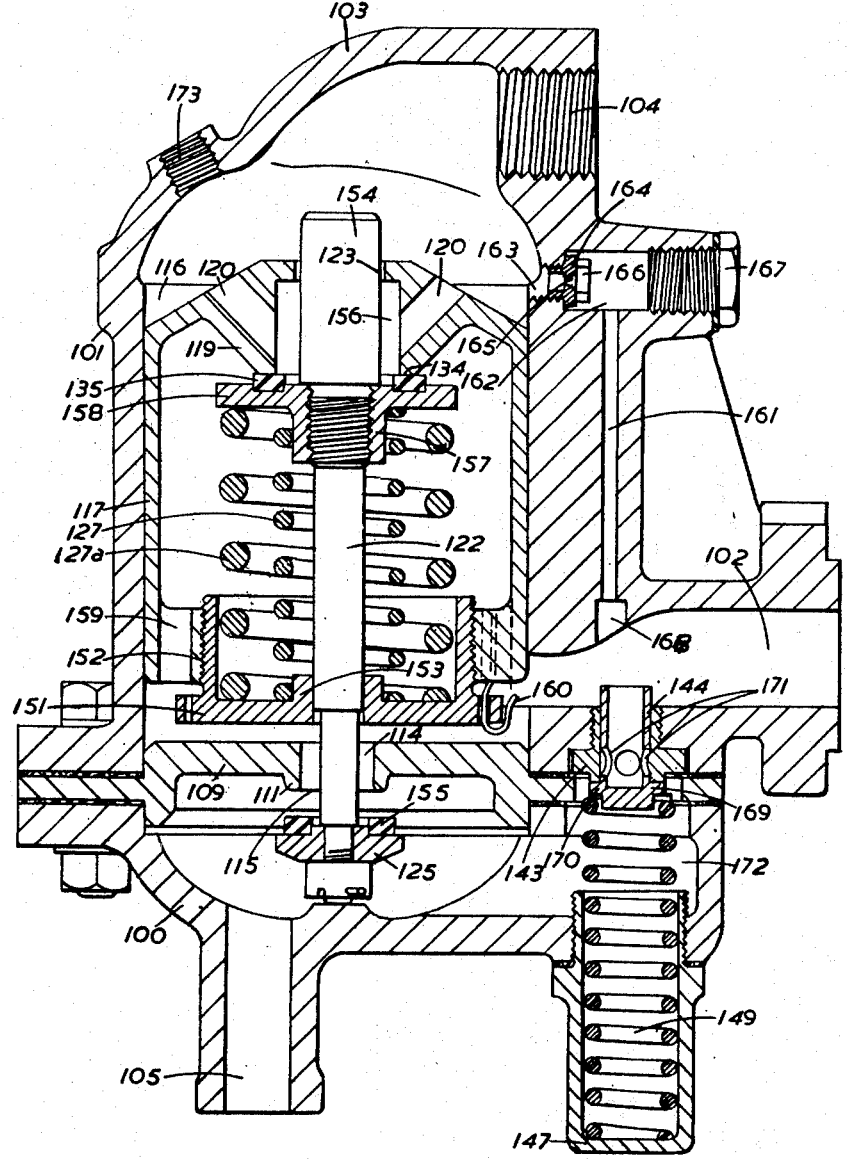

Patented Dec. 2, 1952

2,619,979

UNITED STATES PATENT OFFICE 2,619,979

UNLOADER FOR HYDRAULIC PUMPS

Camille Clare Sprankling Le Clair, Acton, London, England, assignor to Tecalemit Limited, Brentford, England, a corporation of Great Britain Application October 1, 1947, Serial No. 777,326
In Great Britain October 14, 1946

11 Claims. (Cl. 137—108)

This invention relates to unloader or relief valve apparatus for use in connection with hydraulic pumps in general, and more particularly with pumps used for delivering water under high pressure such as for washing motor vehicles and for other purposes.

Certain known unloader valves comprise a mechanical or hydraulic device, usually operated by an accumulator, such that when the quantity of liquid delivered is in excess of requirements, a suction valve is lifted and held in its raised position so that water which enters the pump on the suction stroke is passed back again through the suction valve to a water storage tank on the delivery stroke, none being discharged to the place of use or to the accumulator.

Such unloader valves are, however, apt to cause shock since, if the apparatus functions during a discharge stroke the suction valve not only has to be lifted inwardly against the discharge pressure which is usually high, but the act of lifting it causes the pressure in the pump to be instantaneously released, giving a sudden release of stress throughout the driving mechanism.

An even worse shock takes place if, after the unloader valve has been lifted, it is closed during a discharge stroke, since this correspondingly entails an instantaneous application of stress. In the case of a multiple pump installation, at least one pump is always on its discharge stroke, so that a shock inevitably occurs every time the apparatus operates.

It is accordingly one of the objects of the present invention to provide an improved unloader valve which will operate without shock.

The unloader valve according to the present invention comprises a body having an inlet which is adapted to be connected to a pump outlet, a main outlet which is adapted to be connected to the place of use of the liquid, a subsidiary outlet for excess liquid, a flow-sensitive device which is movably arranged in the said body and is formed with at least one main port adapted to provide communication between the inlet and the main outlet, at least one subsidiary port which is adapted to provide communication between the inlet and the subsidiary outlet, a main valve which is adapted to open and close the said main port and thus to control the flow of liquid to the main outlet, a subsidiary valve which is adapted to open and close the said subsidiary port and thus to control the flow of fluid to the subsidiary outlet, means connecting the two said valves to cause them to move in unison and spring means acting to hold the main valve closed, the arrangement being such that when liquid is flowing from the inlet to the main outlet and thence to the place of use the main valve in the flow-sensitive device is forced open and the said device occupies one operative position in which it holds the subsidiary valve shut, whereas when no liquid is flowing to the place of use through the main outlet the main valve automatically closes and the said device moves to a second operative position in which the subsidiary valve is open and excess liquid flows from the inlet to the subsidiary outlet.

The said flow-sensitive device is preferably slidable in the body of the apparatus and may consist of a piston which is formed with a number of main ports, the opening and closing of which is controlled by the main valve. The latter may be arranged upon a valve spindle which is slidable relatively to the piston and upon which is also mounted a subsidiary valve adapted to cooperate with a valve seat provided upon a fixed, apertured valve seat member within the said body.

The said spring means may comprise a spring which reacts between the piston and an abutment on the valve spindle and which urges the main valve towards its closed position.

When the pump is running and no liquid is being used the main valve is closed by the action of the spring and the subsidiary valve is open. Back pressure is built up on the inlet side of the piston and a pressure equal to this back pressure is allowed to build up on the outlet side of the piston through a small throttle port or passage formed in the piston or in the body of the apparatus.

As soon as liquid is allowed to flow to the place of use, however, the pressure on the outlet side of the piston falls and the piston is displaced against the force of the spring, taking the two valves with it. As a result of this movement of the piston the subsidiary valve closes, after which the continued movement of the piston opens the main valve, thus permitting liquid to flow through the main ports in the piston, the said spring being compressed and acting to hold the subsidiary valve closed.

When the flow of liquid to the place of use is cut off the piston is moved back by the spring, thus closing the main ports through the piston. The subsidiary valve then opens, thus allowing the whole of the liquid discharged by the pump to be returned through the subsidiary outlet to the storage tank or other container to which the subsidiary outlet is connected.

Although it is preferred to use a slidable piston as the flow-sensitive device, it will be appreciated that use could be made of a transverse flexible diaphragm fixed at its peripheral edge in the body of the apparatus or, alternatively, a flexible bellows could be used.

One constructional form of the invention, as applied to an unloader valve which is adapted to be fitted to a pump for supplying high pressure water to apparatus for washing motor vehicles, will now be described, by way of example, with reference to the accompanying drawings.

In the drawings:

Figure 2 is a similar view of a modification of the apparatus shown in Figure 1.

Figure 1:
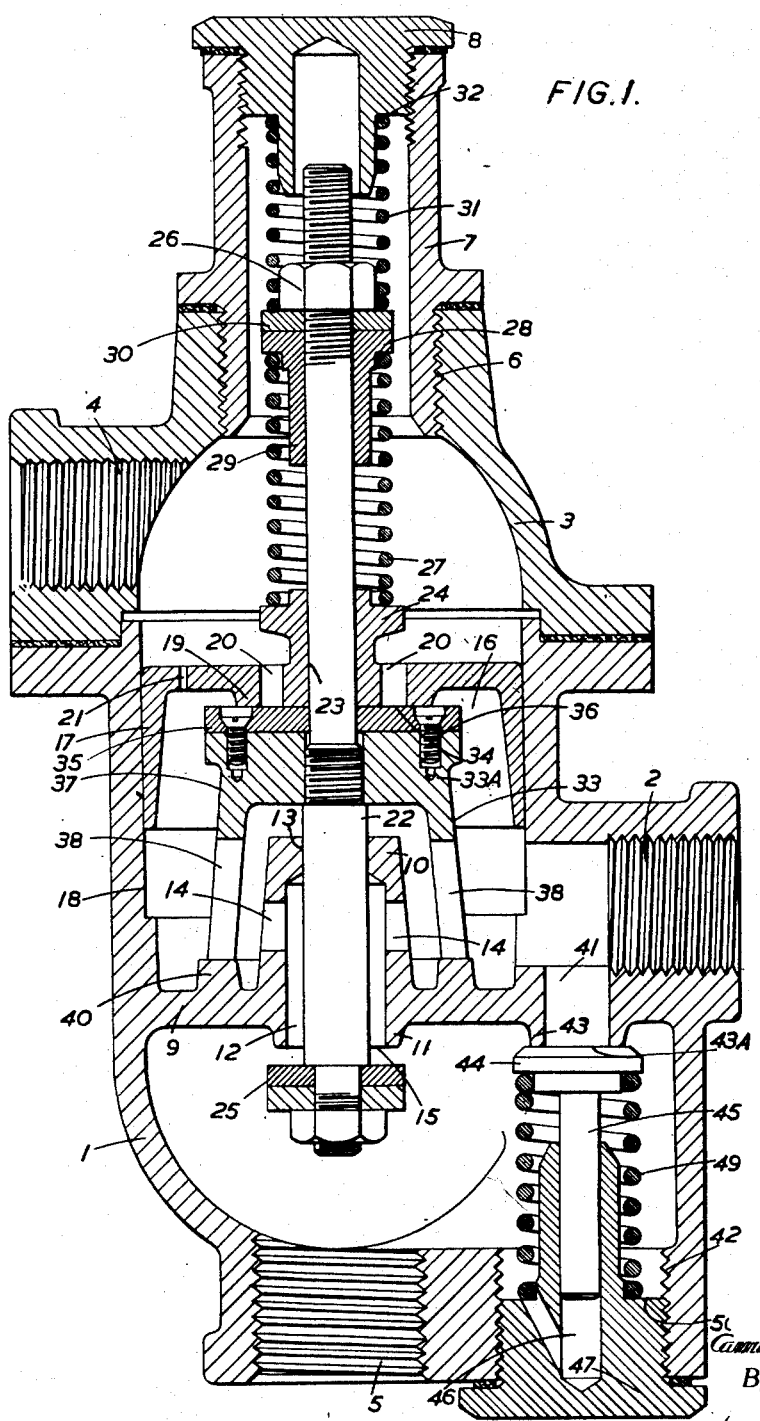
Figure 1 is a transverse sectional view of one form of unloader valve apparatus, constructed in accordance with the invention.

Referring first to Figure 1, the unloader valve comprises a valve body 1 having a lateral inlet 2 which is connected to a water pump which is not shown in the drawing. The open upper end of the body is closed by a dome-shaped cover 3 formed with a lateral main outlet 4 which is connected to a water delivery pipe or hose (not shown). This pipe or hose is fitted with a control valve of suitable type at or near the place of use. The valve body is also formed with a relief or subsidiary outlet 5 located at the bottom of the body. This outlet is connected to the water supply tank.

An aperture in the top of the cover 3 is threaded at 6 to receive the threaded lower end of a sleeve 7 which is threaded internally at its upper end to receive a threaded, hollow closure plug 8.

The valve body 1 is formed with a transverse partition 9 which is formed centrally with an upper boss 10 and with a coaxial lower boss 11. The two bosses are formed with a common central recess 12 and the upper wall of the boss 10 is formed as a machined guide 13, the purpose of which will be explained hereinafter. The upper boss 10 is also formed with a number of lateral ports 14, which provide communication between the inlet 2 and the interior of the body above the partition 9, on the one hand, and the recess 12 and the space in the body below the partition 9, on the other hand. The lower face of the boss 11 is machined to form a flat annular seat 15 for the subsidiary valve which latter will be described later.

A cup-shaped piston 16 with its skirt 17 directed downwards towards the partition 9 is slidably arranged in the machined bore 18 of the valve body 1 between the inlet 2 and the main outlet 4. A boss 19 projects slightly from the underside of the flat crown of the piston and through it a number of longitudinal ports 20 are formed so as to provide communication between the interior of the body 1 above and below the piston 16. The lower face of the boss 19 is machined to form a flat seat 34 for the main valve, as will be described later.

Coaxial with the boss 19 is a second boss 24 extending upwardly from the crown of the piston 16. This boss is of smaller diameter than the boss 19 and is flanged at its upper end to afford an abutment for a spring 27. The two bosses are formed with a common central guideway 23 the purpose of which will be described later.

A throttle port 21 of small diameter is also formed through the crown of the piston 16 between the boss 19 and the skirt 17.

A valve spindle 22 is slidably guided in the aforesaid guide 13 on the partition 9 and guide 23 in the bosses of the piston 16.

The lower end of the valve spindle 22 projects below the valve seat 15 on the partition 9 and is provided with a head 25 comprising a facing and a backing washer secured by a nut. This head, which constitutes the subsidiary valve, is adapted to cooperate with the valve seat 15 to open and close communication between the spaces above and below the partition 9 and thus between the inlet 2 and the subsidiary outlet 5.

The upper end of the valve spindle 22 projects upwardly through the said guideway 23 in the piston 16 this end of the spindle being threaded to receive an abutment in the form of a nut 26 which is adjustably screwed thereon. A heavy coil spring 27 is arranged around the spindle 22 and reacts between the said boss 24 on the piston 16 and the flange 28 of a sleeve 29 which is slidably mounted on the spindle 22 below a washer 30 which is arranged below the abutment nut 26. A lighter spring 31 reacts between the washer 30 and a second abutment which is formed by a shoulder 32 on the closure plug 8.

The base 33A of a valve member 33 is fixedly screwed to the valve spindle 22 between the guides 23 and 13 and upon this is mounted a disc 35 which is secured by means of screws 36. This disc, which is larger in diameter than the seat 34 with which it cooperates, constitutes the main valve. The member 33 is formed with a skirt 37 through which are cut a number of lateral ports 38 which provide communicating between the interior of the valve body above the partition 9 and the recess 12 through the ports 14 in the upper boss 10 on the partition.

The above-mentioned heavy spring 27 acts to thrust the valve spindle 22 upwards and the piston 16 downwards, relatively to one another, so as to force the main valve 35 into contact with its seat 34 and thus to close the longitudinal ports 20 through the crown of the piston 16. The throttle port 21, however, is so placed that it is not closed when the main valve is seated.

The relatively light spring 31 urges the valve assembly bodily downwards and holds the face of the skirt 37 of the valve member 33 in contact with the face of an annular boss 40 formed on the upper face of the partition 9. Its function is to prevent chattering but it is not essential to the operation of the apparatus and may be omitted if desired, particularly in the case of apparatus which is fixed in the position shown in which the force of gravity acting on the valve assembly is generally sufficient for the purpose. In constructions in which the spring 31 is omitted, the sleeve 7 may be shortened and formed with a closed end, the plug 8 being omitted.

A relief port 41 formed in the body 1 provides communication between the inlet 2 and the space in the valve body below the partition 9 which leads to the subsidiary outlet 5. The lower end of this relief port is surrounded by a valve seat 43A formed by the machined face of a boss 43. A relief valve 44 cooperates with the valve seat 43A and is integral with a stem 45 which is slidably guided in a bore 46 formed centrally in a closure plug 47, which latter is screwed into a threaded hole 42 in the base of the valve body. The relief valve 44 is thrust on to its seat by a coil spring 49 which reacts between the back of the valve and a shoulder 50 formed upon the plug 47.

When the washing apparatus is not in use and the said control valve at the outlet end of the hose is closed, the piston 16 and the valve spindle 22, with the two valves 25 and 35 thereon, are all thrust downwards by the force of gravity and by the spring 31, the thrust of which latter is communicated to the piston through the heavy spring 27. The skirt 37 of the main valve member 33 is thrust against the annular stop 40, the subsidiary valve 25 is forced off its seat and the valve seat 34 on the boss 19 of the piston 16 is forced against the main valve 35, the longitudinal ports 20 through the piston thus being closed.

The amount of possible opening of the subsidiary valve 25 permitted by the stop 40 is such that when the water pump is started up and run at its normal speed, although the whole of the water discharged can pass through the ports 38 and 14, through the recess 12 past the subsidiary valve 25 and thus into the outlet 5, yet a certain small back pressure is built up in the space below the piston 16 in the valve body due to the resistance of these passages.

This back pressure causes a flow of water through the said throttle port 21 in the piston, thus permitting water to fill the space above the piston and also to fill the delivery pipe or hose attached to the main outlet 4 up to the control valve at the end of the pipe or hose. A pressure is thus built up in the space above the piston 16 and in the said pipe or hose equal to the aforesaid back pressure. The pressure difference on the two sides of the piston thus becomes zero and the piston exerts no force in either direction, this being the normal condition when the pump is running and no water is being used.

When the control valve at the end of the delivery pipe or hose is opened, however, the pressure in the pipe or hose and in the space above the piston 16 immediately falls, and the piston, under the influence of the pressure acting below it, moves upwards, taking with it by virtue of the heavy spring 27 the valve spindle 22 and the two valves 25 and 35.

The upward movement of the valve spindle first causes the subsidiary valve 25 to contact with its seat 15, thereby preventing the flow of water through the subsidiary outlet 5 and enabling the pressure in the apparatus to build up to the full working figure. The seating of the valve 25 arrests its forward movement and also the upward movement of the valve spindle 22 and the main valve 35, so that further upward movement of the piston carries it with its valve seat 34 away from the valve 35, thus causing the longitudinal ports 20 to open and permitting the discharge of water to the place of use. This further movement of the piston 16 compresses the spring 27, the strength of which is sufficient to hold the valve 25 in contact with its seat 15 against the full working pressure of the apparatus.

The subsidiary valve 25 can only be held on its seat by virtue of the upward thrust exerted upon it by the piston through the heavy spring 27, and this thrust can only be produced by a difference of pressure above and below the piston.

Thus, if the effective diameter of the piston is six times the effective diameter of the subsidiary valve 25, its area thus being thirty-six times the area of the valve, the pressure difference across the piston will be one thirty-sixth of the pressure of the valve. In other words, one thirty-sixth or approximately 3% of the pressure provided by the pump is lost in the apparatus and does not reached the place of use of the water. Thus, it is necessary to adjust the pump pressure to 3% above the required working pressure.

When the said control valve on the hose is closed the further flow of water through the longitudinal ports 20 in the piston is arrested. Almost immediately the pressures above and below the piston will be equalised and the piston will consequently descend under the influence of the spring 27 until the valve seat 34 contacts the main valve 35, thus closing the longitudinal ports 20. Thereafter, the piston 16 and the spindle 22 will descend in unison under the influence of the spring 31 and/or gravity and the subsidiary valve 25 will again be moved off its seat.

After the control valve on the hose has been closed and before the valve 25 can open to its designed amount, however, it is necessary for the piston to move an appreciable distance, first to close the ports 20 and then to open the valve 25. During the latter part of this motion the speed of movement of the piston is limited by the speed at which water can pass through the throttle port 21 to fill the void which would otherwise form in the space above the piston. Hence an appreciable delay must occur between the closing of the control valve and the opening of the subsidiary valve 25. During this delay pressure within the apparatus might build up to a dangerous level and cause damage to the apparatus and injury to persons in the vicinity. Such a rise of pressure is prevented by the opening of the relief valve 44 which provides temporary communication between the inlet 2 and the subsidiary outlet 5.

The lowering of the valve 25 then opens full communication between the inlet 2 and the subsidiary outlet 5, thus permitting the whole of the pump discharge to return to the storage tank, as previously explained. As soon as this occurs the relief valve 44 will close again.

The working pressure of the apparatus is determined by adjusting the compression of the spring 27 by means of the said threaded abutment nut 26 on the valve spindle 22. This is so adjusted that when the piston 16 with its valve face 34 is moved away from the main valve 35 and the longitudinal ports 20 through the piston are opened, as previously explained, the thrust on the spring 27 is sufficient to hold the subsidiary valve on its seat against the full working pressure of the pump which, as stated previously, is slightly in excess of the pressure delivered to the place of use.

Figure 2 of the drawings shows a modified form of unloader valve which incorporates various improvements over the valve shown in Figure 1, although the principle of operation is fundamentally the same in the two constructions.

Referring to Figure 2 the valve comprises a body 101 which is formed with an integral cover 103 and is closed at its lower end by means of a removable base cover 100, the whole forming a chamber for the valve mechanism and being formed with an inlet 102, with a main outlet 104 and with a subsidiary outlet 105, these inlets and outlets corresponding to the inlets and outlets 2, 4 and 5, respectively, of Figure 1.

A partition plate 109, the edges of which are clamped between the body 101 and the base cover 100, divides the interior of the body into upper and lower chambers which communicate with each other by means of a central port 114 formed in the partition 109. On the underside of the partition 109 it is formed with an annular rim or boss 111, the lower edge of which is machined to form a valve seat 115.

A piston 116 having a skirt 117, which parts correspond to the piston 16 and skirt 17 of Figure 1, is slidable within the body 101 and constitutes the pressure-sensitive device. A cap 151 is screwed into the lower open end of the skirt 117, which is flanged inwardly and formed with a thread 152 for this purpose. The cap 151 is formed with a projecting centrally-bored boss 153 which provides a guide for the lower end of a valve spindle 122. The upper end of this spindle is enlarged at 154 and is slidable in a guideway 123 formed in the crown of the piston 116.

The lower end of the valve spindle 122 below the cap 151 is reduced in diameter and passes through the port 114 in the partition 109 and carries a subsidiary valve head 125. This valve head is provided with a removable facing washer 155 which is adapted to engage on the valve seat 115 to close the port 114 when the spindle 112 is moved upwardly.

The head of the piston 116 is formed with an internal conical boss 119, the lower end of which is machined to form an annular valve seat 134. This seat surrounds the lower end of an enlarged bore 156 which is formed in the boss 119 below the guideway 123. This bore 156 is connected with the space above the piston by means of a number of inclined ports 120 bored through the head of the piston.

The valve spindle 122 is threaded immediately below its enlarged end 154 to receive a flanged sleeve 157. A valve washer 135, which fulfills the function of the disc 35 of Figure 1, is provided on the upper face of the flange 158 of the sleeve 157 and cooperates with the valve seat 134. This constitutes the main valve and controls the flow of liquid from the space within the piston 116 to the space above the latter. The interior of the piston is in free communication with the space below the cap 151 by means of a series of ports 159 which are formed through the flange at the bottom of the skirt 117 around the cap 151.

Two concentric compression springs 127 and 127A are arranged between the flange 158 and the cap 151 at the bottom of the piston. This cap 151 is screwed into the inwardly turned flange on the piston skirt 117 by means of the thread 152 until the springs 127 and 127A are given the desired compression, whereafter the cap 151 is locked in position by means of a locking wire 160 which is passed through holes drilled in the cap 151 and in the flange of the piston skirt.

It will be apparent that the parts of the apparatus so far described correspond operationally to those parts shown in Figure 1 which bear corresponding reference numbers. Thus the piston 116 corresponds to the piston 16, the main valve 135 with its seat 134 correspond to the valve 35 and seat 34, while the subsidiary valve 125 and its seat 115 correspond to the subsidiary valve 325 with its seat 15. The main valve 135 controls the flow of liquid from the inlet 102 and the space below the piston, via the ports 159, the interior of the piston and the ports 120, to the main outlet 104. Similarly the subsidiary valve 125 controls the flow of liquid from the inlet 102 through the port 114 to the subsidiary outlet 105.

In the construction of Figure 2, however, there is no spring corresponding to the spring 31 acting on the valve assembly, since, as previously explained, such a spring is not essential.

Furthermore, the piston 116 is not formed with a throttle port corresponding to the port 21, the functions of this port being fulfilled by a throttle passage which is formed in the wall of the body 101. This passage comprises a vertical passage 161 which leads from the inlet 102, at its lower end, to a horizontal bore 162 also formed in the body 101, at its upper end, the inner end of this bore 162 being connected with the interior of the body 101 by means of a threaded bore 163 of reduced diameter. A jet member 164, which is formed with a jet orifice 165, is screwed into the bore 163. To facilitate the insertion and removal of the member 164 it is formed with a flange 166 which is slotted to receive a screw-driver or like tool. The outer end of the bore 162 is closed by means of a screw plug 167 which can be removed when access is required to the jet member.

The effective size of the throttle passage is determined by the size of the jet orifice 165. To vary this it is only necessary to remove the member 164 and to replace it by a similar member having an orifice of a different size.

In order to prevent the flow of water through the inlet 102 past the lower end of the throttle passage 161 from exerting any suction effect which upset the operation of the apparatus, the lower part of the passage 161 is enlarged as shown at 168. If desired the whole passage could be made of the same diameter as the part 168.

The location of the throttle passage in the wall of the body instead of in the piston as previously described has the advantage that it enables the effective size of the throttle passage to be readily adjusted as required to obtain the best results, without having to dismantle the apparatus.

The construction shown in Fig. 2 is also provided with a relief valve 144, which fulfils exactly the same function as the valve 44 of Figure 1. In this case, however, the valve 144 is shown as being of tubular form, being slidable within a hollow valve seat member 143 which is screwed into a threaded bore formed in the lower part of the body 101. The lower end 169 of the seat member 143 forms a seat against which a flange 170 on the valve member 144 is adapted to engage. A spring 149 acts on the valve 144 to urge it into its upper or closed position, the lower end of the spring being contained in and bearing against the bottom of a recessed cover 147 which is screwed into the bottom of the base 100.

The valve 144 is formed with a series of ports 171 which are closed when the valve is in its upper position as shown. When, however, the valve is forced down by pressure of liquid in the inlet 102, the ports 171 pass below the rim of the valve seat 169 and thus allow the escape of the liquid past the valve into the space 172 and thence to the subsidiary outlet 105.

A threaded bore 173 may be provided in the top of the casing, if desired, for the connection of a pressure gauge.

The modified form of unloader valve shown in Figure 2 operates in a similar manner to that described with reference to Figure 1 and its operation will be clear from the foregoing description taken in conjunction with the drawings.

I claim:

1. Unloader valve apparatus comprising a body having an inlet adapted to be connected to a pump outlet, a main outlet adapted to be connected to the place of use of the liquid, a subsidiary outlet for excess liquid, means dividing said body into a pair of spaces so that said inlet and said main outlet communicate with the first space and said subsidiary outlet communicates with the second space, a flow sensitive device movably mounted in said first space and positioned between said inlet and said main outlet and having at least one main port adapted to provide communication between said inlet and said main outlet and a main valve seat at said port, at least one subsidiary port in said dividing means adapted to provide communication between said first space and said second space and therefore between said inlet and said subsidiary outlet, a main valve member which by cooperation with said main valve seat is adapted to open and close said main port and to control the flow of liquid between said inlet and said main outlet, a subsidiary valve member to open and close said subsidiary port and to control the flow of liquid to said second space and said subsidiary outlet, means interconnecting said valve members to cause them to move in unison so that when one port is closed the other port is open, and spring means urging said main valve member to port closing position, so that when liquid under pressure is flowing from said inlet to said main outlet said main port is opened by the liquid pressure in said first space moving said flow sensitive device to a first operative position wherein said subsidiary valve member is moved to closed position and when no liquid flows through said main outlet due to excessive back pressure thereat said main port is automatically closed and said flow sensitive device is moved to a second operative position wherein said subsidiary valve member is moved to open position and excess liquid flows from said inlet through said first space through said subsidiary port to said second space and said subsidiary outlet.

2. Unloader valve apparatus as claimed in claim 1 wherein a cylinder is formed in said first space and said flow sensitive device comprises a piston slidable in said cylinder.

3. Unloader valve apparatus comprising a body having an inlet adapted to be connected to a pump outlet, a main outlet adapted to be connected to the place of use of the liquid, a subsidiary outlet for excess liquid, means dividing said body into a pair of spaces so that said inlet and said main outlet communicate with the first space and said subsidiary outlet communicates with the second space, a cylinder formed in said first space, a flow sensitive piston positioned between said inlet and said main outlet slidable in said cylinder, said piston having at least one main port adapted to provide communication between said inlet and said main outlet and a main valve seat at said port, at least one subsidiary port in said dividing means adapted to provide communication between said first space and said second space and therefore between said inlet and said subsidiary outlet, a main valve member which by cooperation with said main valve seat is adapted to open and close said main port and to control the flow of liquid between said inlet and said main outlet, a subsidiary valve member to open and close said subsidiary port and to control the flow of liquid to said second space and said subsidiary outlet, a common valve spindle slidably guided relative to said piston and interconnecting said valve members to cause them to move in unison so that when one port is closed the other port is open, an abutment carried by said spindle, and spring means reacting between said piston and said abutment to move said main valve member to port closing position, so that when liquid under pressure is flowing from said inlet to said main outlet said piston is moved to a first position to open said main port and to close said subsidiary port and when no liquid flows through said main outlet due to excessive back pressure thereat said piston is moved to a second operative position wherein it closes said main port and opens said subsidiary port and excess liquid flows from said inlet through said first space through said subsidiary port to said second space and said subsidiary outlet.

4. Unloader valve apparatus as claimed in claim 3 including means for adjusting the position of said abutment on said valve spindle to adjust the spring loading.

5. Unloader valve apparatus comprising a body having an inlet adapted to be connected to a pump outlet, a main outlet adapted to be connected to the place of use of the liquid, a subsidiary outlet for excess liquid, a partition dividing said body into a pair of spaces so that said inlet and said main outlet communicate with the first space and said subsidiary outlet communicates with the second space, a flow sensitive device movably mounted in said first space and positioned between said inlet and said main outlet and having at least one main port adapted to provide communication between said inlet and said main outlet and a main valve seat at said port, a subsidiary port in said partition to provide communication between said first space and said second space and therefore between said inlet and said subsidiary outlet, a main valve member which by cooperation with said main valve seat is adapted to open and close said main port and to control the flow of liquid between said inlet and said main outlet, a subsidiary valve member to open and close said subsidiary port and to control the flow of liquid to said second space and said subsidiary outlet, a valve spindle slidably guided relative to said flow sensitive device and said partition and interconnecting said valve members to cause them to move in unison so that when one port is closed the other port is open, and spring means urging said main valve member to port closing position, so that when liquid under pressure is flowing from said inlet to said main outlet said main port is opened by the liquid pressure in said first space moving said flow sensitive device to a first operative position wherein said subsidiary valve member is moved to closed position and when no liquid flows through said main outlet due to excessive back pressure thereat said main port is automatically closed and said flow sensitive device is moved to a second operative position wherein said subsidiary valve member is moved to open position and excess liquid flows from said inlet through said first space through said subsidiary port to said second space and said subsidiary outlet.

6. Unloader valve apparatus as claimed in claim 5, including means associated with said valve spindle and engageable with said partition for limiting the opening movement of said subsidiary valve member.

7. Unloader valve apparatus comprising a body having an inlet adapted to be connected to a pump outlet, a main outlet adapted to be connected to the place of use of the liquid, a subsidiary outlet for excess liquid, means dividing said body into a pair of spaces so that said inlet and said main outlet communicate with the first space and said subsidiary outlet communicates with the second space, a flow sensitive device movably mounted in said first space and positioned between said inlet and said main outlet and having at least one main port adapted to provide communication between said inlet and said main outlet and a main valve seat at said port, a throttle port by-passing said flow sensitive device and adapted to equalize the liquid pressure on opposite sides of said flow sensitive device, at least one subsidiary port in said dividing means adapted to provide communication between said first space and said second space and therefore between said inlet and said subsidiary outlet, a main valve member which by cooperation with said main valve seat is adapted to open and close said main port and to control the flow of liquid between said inlet and said main outlet, a subsidiary valve member to open and close said subsidiary port and to control the flow of liquid to said second space and said subsidiary outlet, means interconnecting said valve members to cause them to move in unison so that when one port is closed the other port is open, and spring means urging said main valve member to port closing position, so that when the liquid pressure at said main outlet is reduced said main port is opened by the unbalance of liquid pressure between said inlet and said main outlet moving said flow sensitive device to a first operative position wherein said subsidiary valve member is moved to closed position and when no liquid flows through said main outlet due to excessive back pressure thereat said main port is automatically closed and said flow sensitive device is moved to second operative position wherein said subsidiary valve member is moved to open position and excess liquid flows from said inlet through said first space through said subsidiary port to said second space and said subsidiary outlet.

8. Unloader valve apparatus as claimed in claim 7 wherein said throttle port is formed in said flow sensitive device to provide communication between the opposite sides thereof.

9. Unloader valve apparatus as claimed in claim 7 wherein a cylinder is formed in said first space, said flow sensitive device comprises a piston slidable in said cylinder, and said throttle port is formed in said piston to provide constant communication between the opposite sides thereof to equalize the pressure on both sides thereof when said main port is closed.

10. Unloader valve apparatus as claimed in claim 7 wherein said throttle port is formed in a throttle passage formed in said valve body around said flow sensitive device.

11. Unloader valve apparatus as claimed in claim 7 including a throttle formed in said valve body around said flow sensitive means, said throttle port being formed by a jet removably mounted in said passage.

CAMILLE CLARE SPRANKLING LE CLAIR.

REFERENCES CITED

The following references are of record in the file of this patent:

UNITED STATES PATENTS

| Number | Name | Date |
|---|---|---|
| 1,052,172 | Rateau | Feb. 4, 1913 |
| 1,199,152 | Bruce | Sept. 26, 1916 |
| 1,215,071 | Steedman | Feb. 6, 1917 |
| 1,421,309 | Redfield | June 27, 1922 |
| 1,902,231 | Gurley | Mar. 21, 1933 |